Figure 1:
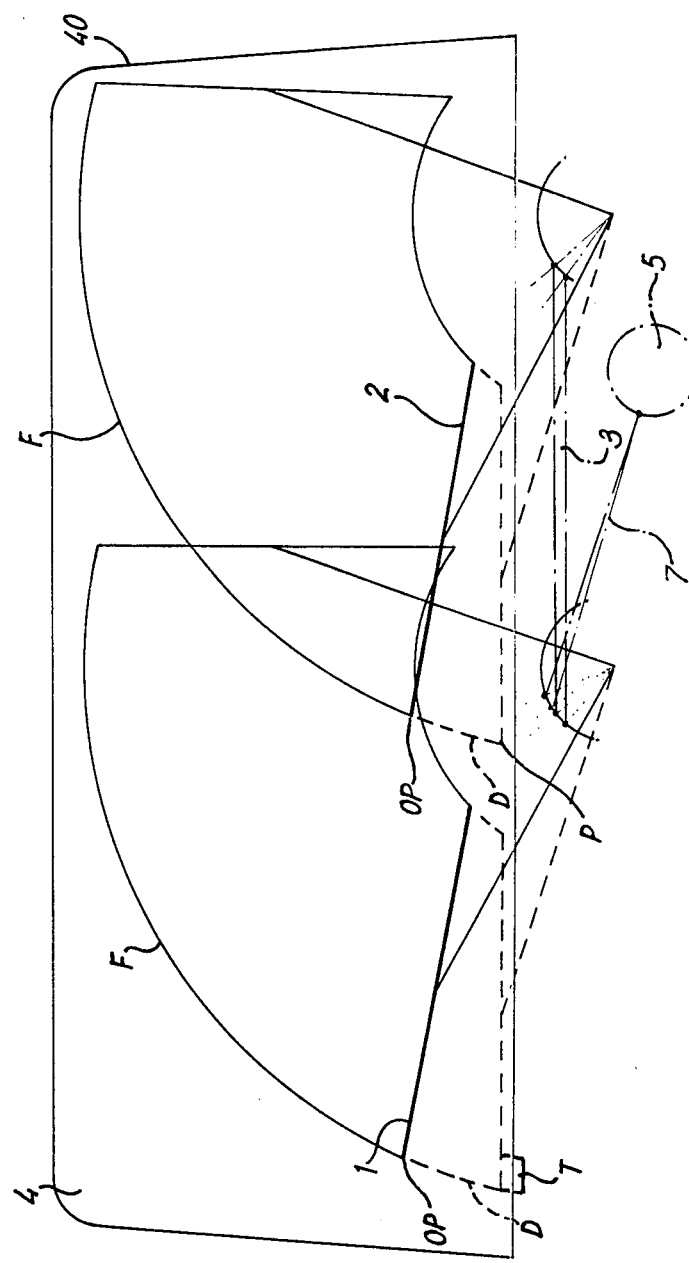

United States Patent [19]

Fallows

[11] Patent Number: 4,559,845
[45] Date of Patent: Dec. 24, 1985

[54] TRANSMISSION MECHANISM

[75] Inventor: Norman H. Fallows, Crewe, England

[73] Assignee: Rolls-Royce Motors Limited, Crewe, England

[21] Appl. No.: 603,337

[22] Filed: Apr. 24, 1984

[30] Foreign Application Priority Data

Apr. 28, 1983 [GB] United Kingdom ............... 8311609

[51] Int. Cl.[4] .................... F16C 3/28; F16H 21/20
[52] U.S. Cl. ................................. 74/600; 15/250.16
[58] Field of Search ............ 74/600, 601; 15/250.16, 15/250.17

[56] References Cited

U.S. PATENT DOCUMENTS

| 2,753,721 | 7/1956 | Latta | 15/250.17 |
| 2,768,530 | 10/1956 | Brundage | 15/250.17 |
| 3,197,796 | 8/1965 | Kato | 15/250.17 |
| 3,262,038 | 7/1966 | Smith | 15/250.17 |
| 3,588,940 | 6/1971 | Mainka | 15/250.17 |
| 4,400,844 | 8/1983 | Hayakawa | 15/250.16 |
| 4,494,421 | 1/1985 | Matuoka | 15/250.17 |

FOREIGN PATENT DOCUMENTS 2900166  7/1979  Fed. Rep. of Germany ... 15/250.16

Primary Examiner—Lawrence J. Staab
Attorney, Agent, or Firm—Cushman, Darby & Cushman

[57] ABSTRACT

A transmission mechanism for a vehicle windscreen wiper arrangement comprises an eccentric driven by an electric motor. A transmission member can be locked either to the eccentric to rotate with it or to a further transmission member which is in turn connected to the linkage of the wiper arrangement. In the second case the wiper arrangement performs a normal on screen wiping motion and in the first case, with the direction of the motor reversed, the wiper arrangement is driven from an on screen to an off screen park position. During this part of its travel the wiper speed is reduced as compared with the normal wiping speed. The mechanism is adaptable to existing wiper arrangements.

10 Claims, 6 Drawing Figures

TRANSMISSION MECHANISM

The present invention relates to a transmission mechanism particularly, but not exclusively, for a vehicle windscreen wiper of the self parking off screen type. Such windscreen wipers have two basic working cycles. These are the normal wipe cycle and the on screen/off screen park cycle. In the normal wipe cycle the wipers execute a normal wiping movement across the screen. In the on screen/off screen park cycle, the wipers move off the screen at the end of the normal wiper cycle to the off screen park position or, in reverse, from the off screen park position onto the screen at the beginning of the normal wiping movement across the screen. As the wiper approaches the park position it is advantageous for the speed of the wiper to be reduced as compared with the normal speed at which it moves across the screen. This reduction promotes smoothness and quietness of operation and reduces the risk of damage to both the wiper itself and the windscreen surround. Arrangements for reducing wiper speed in this way are already known, but these are complex in construction and operation and not easily adaptable to existing wiper mechanisms.

According to the present invention, there is provided a transmission mechanism comprising a first transmission member, an eccentric rotatably mounted in the member, means for preventing relative rotation of the member and eccentric when the eccentric rotates in one direction a further transmission member rotatably mounted on the first transmission member and means for preventing relative rotation of the first and the further members when the eccentric rotates in the opposite direction to the first mentioned direction whereby in one operating mode of the mechanism the first mentioned member may rotate eccentrically with the eccentric in the said one direction and in a second operating mode of the mechanism with the eccentric rotating in the opposite direction relative rotational movement of the members may be prevented and relative movement of the eccentric and first member is permitted to impart an additional throw to the first and further members.

In a preferred embodiment, the mechanism forms part of a windscreen wiper arrangement for a vehicle. The eccentric is connected to the output shaft of a wiper motor and the further transmission member, advantageously through a link gimbal, to a linkage connected to the wiper arms. In the normal wiping mode, the motor reciprocates the linkage and arms through the eccentric and first transmission member which are locked together by the means for preventing. When the wipers are switched off, the direction of rotation of the wiper motor is reversed from its normal clockwise to anticlockwise rotation when the wiper reaches the on screen park position. At this point the means for preventing relative rotation are withdrawn permitting the eccentric to rotate relative to the first transmission member which is a crank. The means preventing relative rotation of the first and further transmission members are then engaged to lock these two members together. The eccentric as it rotates then imparts a further throw to the members to displace the wiper arms a further arc from the on screen to the off screen park position. In this position a limit switch is operated to switch off the wiper motor. When the wipers are next switched on the members remain locked together and drive the wiper arms from the off screen to the on screen park positions on a clockwise rotation of the motor. At the on screen park position the members unlock and the means for preventing relative rotational movement of the eccentric and crank engage so that the wiper linkage is once again driven by the locked combination of the eccentric and crank in the normal wiping mode.

Figure 2:
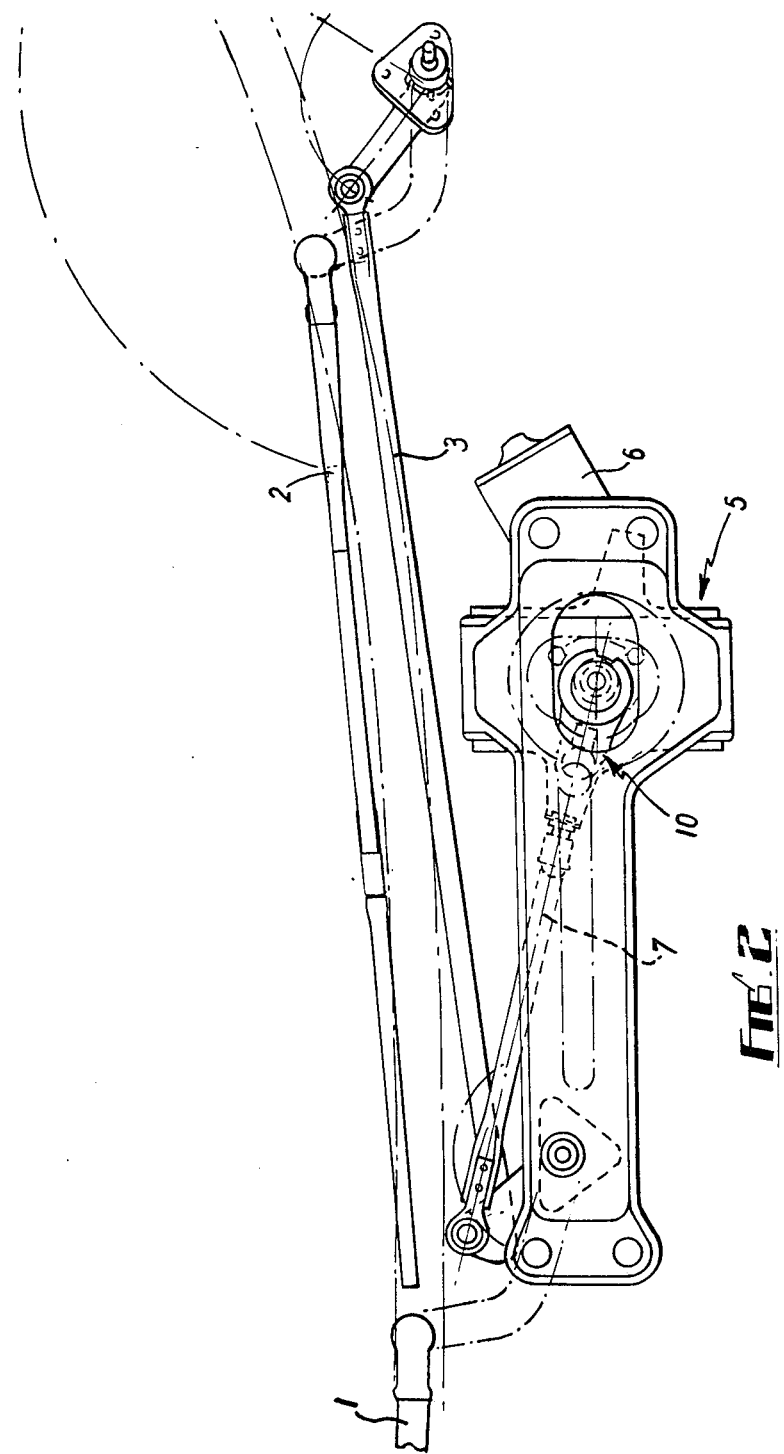
Figure 3:
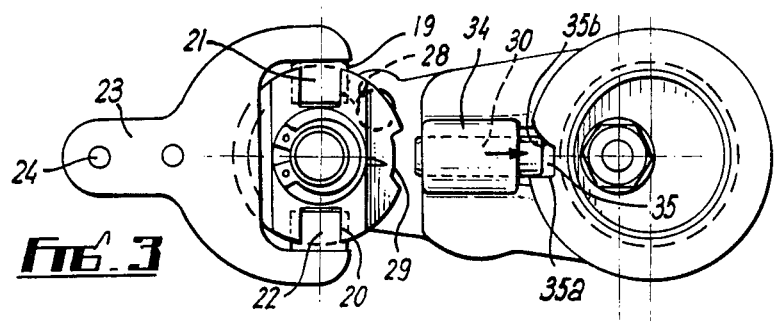
Figure 4:
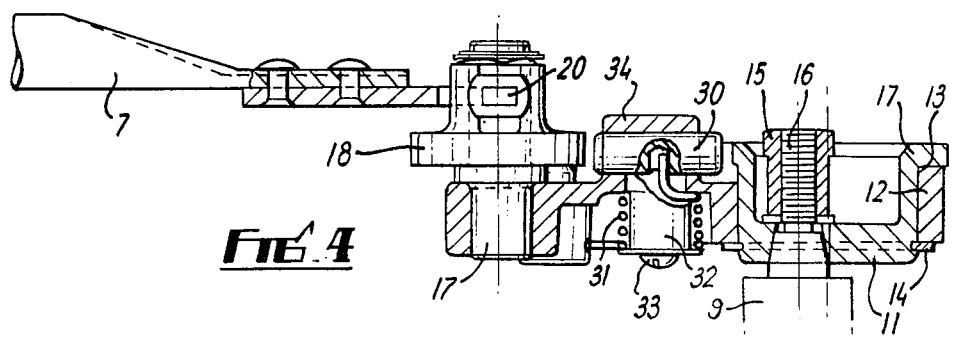
Figure 5:
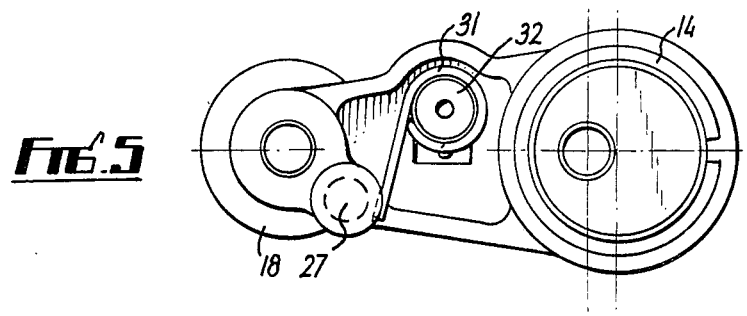
Figure 6:
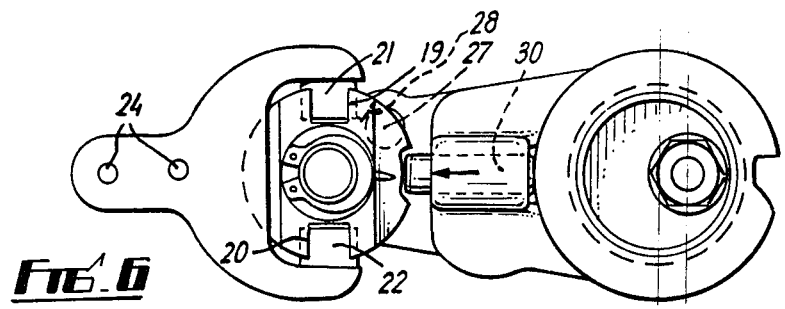

In order that the invention may be more clearly understood, one embodiment thereof will now be described, by way of example, with reference to the accompanying drawings in which:

FIG. 1 is a diagrammatic illustration of the area swept on a windscreen by a pair of interlinked windscreen wipers, FIG. 2 is a partial view of the wipers of FIG. 1 and a general view of the associated linkage and driving mechanism, FIG. 3 is a plan view of a transmission mechanism forming part of the driving mechanism of FIG. 2, FIG. 4 is a side elevational view of the transmission mechanism of FIG. 3, FIG. 5 is an underplan view of the transmission mechanism of FIG. 1, and FIG. 6 is a view of the transmission mechanism of FIGS. 3 to 5 similar to that of FIG. 3 but with the parts of the mechanism in a different relative position for a different mode of operation.

Referring to FIGS. 1 and 2, the wiper arrangement comprises two wipers 1 and 2 connected by a linkage 3 and arranged to wipe a vehicle wind screen 4. The linkage 3, and through it the wipers 1 and 2, is driven by a driving mechanism indicated generally by the reference numeral 5 and comprising a reversible electric motor 6 and drive linkage 7. The normal wiping arc of each wiper 1, 2 is shown in full line F and the extension of that normal wiping arc to and from the parked off screen position P in dotted line D.

The drive linkage 3 incorporates a transmission mechanism indicated generally by the reference numeral 10 and operative to convert the rotary movement of the output shaft 9 of the motor 6 into a reciprocating movement of the linkage 7. Referring to FIGS. 3 to 6, the mechanism 10 comprises an eccentric 11 mounted on the output shaft 9 of the motor 6. A crank 12 is connected to the eccentric 11. For this purpose the crank 12 defines a bore at one end which receives the eccentric with a running fit. Passage of the eccentric completely through the bore is prevented by means of a flange 13 on the eccentric 11. The eccentric is retained in the crank 12 by means of a circlip 14 which seats in a groove in the eccentric. Connection of the motor output shaft 9 to the eccentric 11 is by means of a retaining nut 15 screwed onto a screwthreaded boss 16 which surmounts a splined tapered portion of the shaft 9.

The end of the crank remote from the eccentric 11 is also formed with a bore. This bore fixedly receives a pin 17 on which a cam wheel 18 is rotatably mounted. The cam wheel 18 is also formed with a boss which defines two slots 19 and 20 which respectively receive the opposing arms 21 and 22 of a gimbal link 23. This gimbal link 23 is in turn rivetted to the linkage 7. The holes to receive these rivets are shown at 24 on FIGS. 3 and 6.

Both the cam wheel 18 and the eccentric 11 are therefore rotatable with respect to the crank 12. This relative rotational movement between eccentric 11 and crank 12 may be prevented by means of a locking member 30. This locking member 30 is spring loaded by means of a helical spring 31 which is supported and retained in position by means of a cylindrical former 32 and assocated screw 33. The locking member 30 is slidably mounted in a housing 34 and has two operative positions. In one position (shown in FIG. 2), which is the normal rest position under the action of the spring 31, the member is urged into contact with the eccentric 11. The eccentric 11 has a recess 35 in its flange 13 which receives the member 30 to lock the eccentric 11 to the crank 12 when the eccentric is driven by the shaft 9 in the clockwise direction and when these two members are in the correct relative rotational position. The recess 35 has an abrupt face 35a at one side and a sloping face 35b or ramp at the other and when the eccentric is being driven in the clockwise direction with the member 30 in position in the recess 35, the member 30 abuts abrupt face 35a. When the eccentric is driven in the anticlockwise direction, the member 30 moves towards the face 35b. When the crank and eccentric are locked together in the above mentioned position, the crank 12 simply acts as an extension of the eccentric 11 and therefore rotates eccentrically on rotation of the motor shaft 9. This eccentric movement reciprocates the linkage 7 and this reciprocal movement is translated into a movement of the wiper blades along the full line arcs F of FIG. 1. Any planar disalignment of the crank 11 with the linkage 7 is catered for by adjusting pivotal movement of the link gimbal 23.

Relative rotational movement between the cam wheel 18 and the crank 12 in the anticlockwise direction of rotation of the shaft 9 may be prevented by means of a spring loaded reverse lock plunger 27 which is operative to engage a detent 28 formed on the underside of the camwheel. The detent has a ramp at one side and an abrupt face at the other and relative rotation is prevented by the abuttment of the plunger 27 with the detent. A recess 29 is also provided in the periphery of the camwheel 18 to accommodate the member 30.

Operation of the above described arrangement is as follows starting with wiper blades 1 and 2 executing normal wiping arcs F (FIG. 1) on the windscreen 4. In that operating mode the wiper motor 5 rotates and drives the eccentric 11 in the clockwise direction. Relative rotational motion in that direction between eccentric and crank 12 is prevented by the abuttment of locking member 30 with the abrupt face 35a of recess 35 in flange 12. Crank 12 therefore acts as an extension of eccentric 11. Camwheel 18 rotates on its pin 17 in an anticlockwise direction relative to the crank 12 and in that direction the detent 28 repeatedly rides over the plunger 27 depressing it against its spring in each revolution.

When the system is switched off, the wiper motor 5 continues in a clockwise direction until an internal switch breaks the motor supply circuit at the on screen park position. At this point a signal from the motor to an external circuit changes the polarity of the supply current and the motor reverses its direction of rotation.

At this position the abrupt side of detent 28 on the underside of the camwheel 18 engages with the reverse lock plunger 27, locking the camwheel to the crank 12. The locking member 30 is now ejected from the recess 35 in the eccentric 11 by the sloping face 35b of the recess 35 into engagement in the recess in the camwheel 18 (see FIG. 6).

The crank 12 is now locked to, and becomes an extension of, the link/gimbal assembly. The eccentric 11 now rotates independently of the crank 12 and effectively becomes a further crank of 5 mm throw.

The motor 5 will continue to rotate the eccentric 11 through a maximum of 180°, moving the locked crank/link in a near linear movement of 10 mm maximum until a limit switch T disposed adjacent the off screen park position P is operated. This movement is of low speed and high torque and will move the wiper arms through the additional arc shown in dashed line in FIG. 1. On actuation of the limit switch T in the off screen park position the motor 5 is switched off. On switching on the wiper system the wiper motor will run in a clockwise direction.

The locking member 30 is still engaged in the recess in the camwheel 18 and rides on the flange of the eccentric 11. Consequently the link 9 and crank 12 are still locked together. The reason for this locking is to prevent any irregular action by the crank 12 trying to drive through friction.

Rotation of the motor 5 drives the eccentric 11 and moves the wiper blades 1 and 2 slowly from the depressed park position P to the on screen park position DP. At this position the locking member 30 will be forced out of the recess in the camwheel 18 by the action of spring 31 into the recess 35 in the eccentric flange which is now opposite.

The link 7 and crank 12 are now unlocked and the motor 5 drives the crank 12 through the eccentric 11 and the wiper arms operate through the fitted arc (see FIG. 3).

The switch T is adjustable, and by designing the geometry of the system to use, say, 8 mm of the travel of the eccentric, the switch can be adjusted to use more (up to a maximum of 10 mm) or less of this travel to ensure the total travel of the wiper arms is as designed; thus enabling the system to compensate for manufacturing tolerances which increase or decrease the wiped area. This is particularly important as the driver's wiper arm should park low down on the windscreen and wipe right up to the 'A' post 40 (see FIG. 1) for maximum vision.

It will be appreciated that the embodiment has been described by way of example only and that many variations are possible without departing from the scope of the invention.

What is claimed is:

1. A transmission mechanism comprising:
a first transmission member;
an eccentric rotatably mounted in said first transmission member;
a first means for preventing relative rotation of said first transmission member and said eccentric when said eccentric rotates in a first direction, said means including a locking member and a formation in said eccentric in which said locking member is operative to engage;
a second transmission member rotatably mounted on said first transmission member; and
a second means for preventing relative rotation of said first transmission member and said second transmission member when said eccentric rotates in an opposite direction to said first direction, said second means including said locking member of first means and a formation in said second transmission member in which said locking member is operative to engage whereby in one operating mode of the transmission mechanism, said first transmission member may rotate eccentrically with said eccentric in said first direction and in a second operating mode of said transmission mechanism with said eccentric rotating in said opposite direction, relative rotational movement of said first transmission member and said second transmission member may be prevented and relative movement of said eccentric and said first transmission member is permitted to impart an additional throw to said first transmission member and said second transmission member.

2. A transmission mechanism as claimed in claim 1, in which said first transmission member is a crank.

3. A transmission mechanism as claimed in claim 1 in which said locking member is spring loaded by a spring and said spring is operative to urge said locking member into a locking position.

4. A transmission mechanism as claimed in claim 1, in which said locking member is spring loaded by a spring and said spring is operative to urge said locking member into an unlocked position.

5. A transmission mechanism as claimed in claim 1, in which said eccentric is mounted on an output shaft of an electric motor.

6. A transmission mechanism as claimed in claim 5, in which said electric motor is operative to rotate said eccentric in said first direction in said one operating mode and in said opposite direction in said second operating mode.

7. A transmission mechanism as claimed in claim 6, in which a limit switch is provided which is actuated to switch off said electric motor at the end of motor travel in said second operating mode.

8. A transmission mechanism as claimed in claim 1, in which said further transmission member is connected to linkage of a windscreen wiper arrangement.

9. A transmission mechanism as claimed in claim 8, in which connection of said further transmission member to said linkage is through a link gymbal.

10. A transmission mechanism as claimed in claim 8, in which said linkage is driven in a normal on screen wipe position in said one operating mode and from an on screen park position to an off screen park position in said second operating mode.

* * * * *